Figure 180:
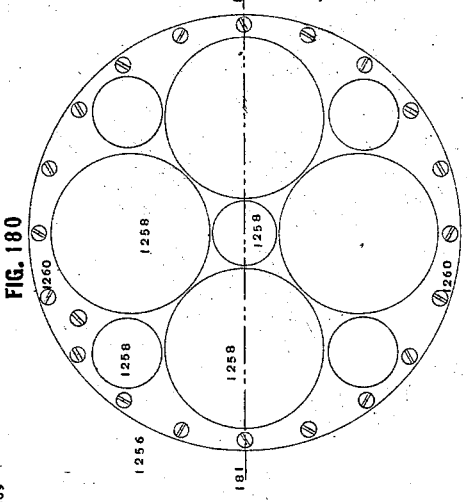

(No Model.) 8 Sheets—Sheet 1.
A. H. EMERY.
MACHINERY FOR TESTING THE STRENGTH OF MATERIALS.
No. 278,915. Patented June 5, 1883.
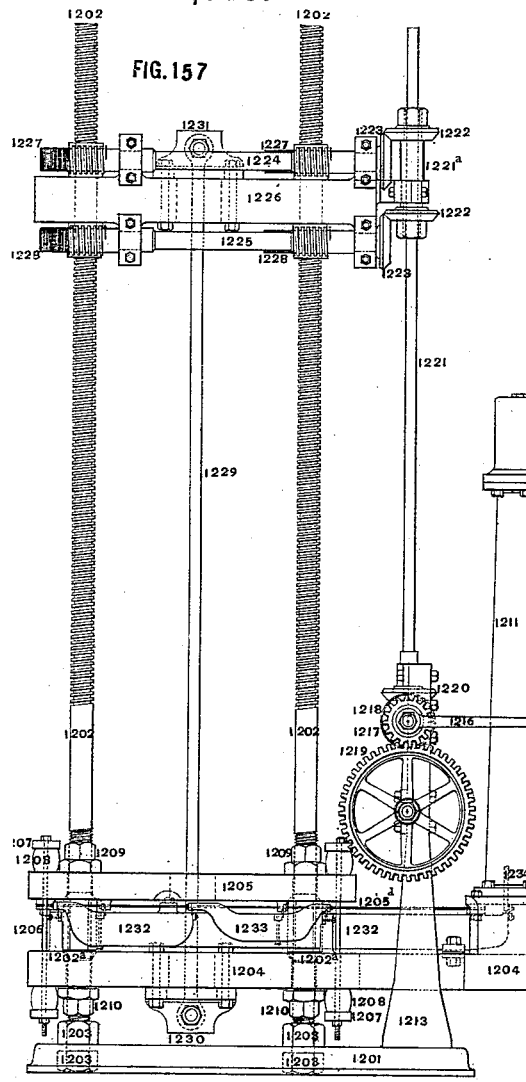
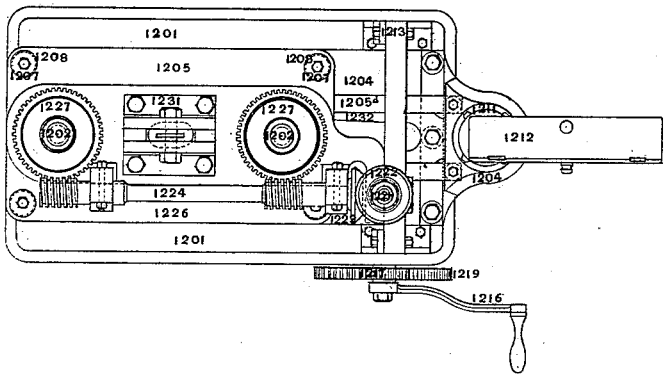
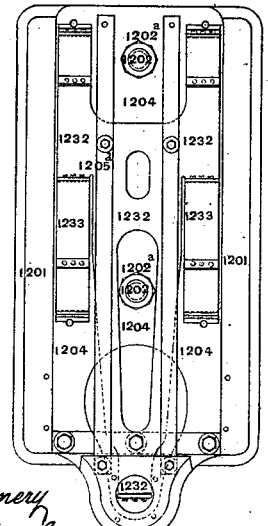

(No Model.) 8 Sheets—Sheet 2.
A. H. EMERY.
MACHINERY FOR TESTING THE STRENGTH OF MATERIALS.
No. 278,915. Patented June 5, 1883.
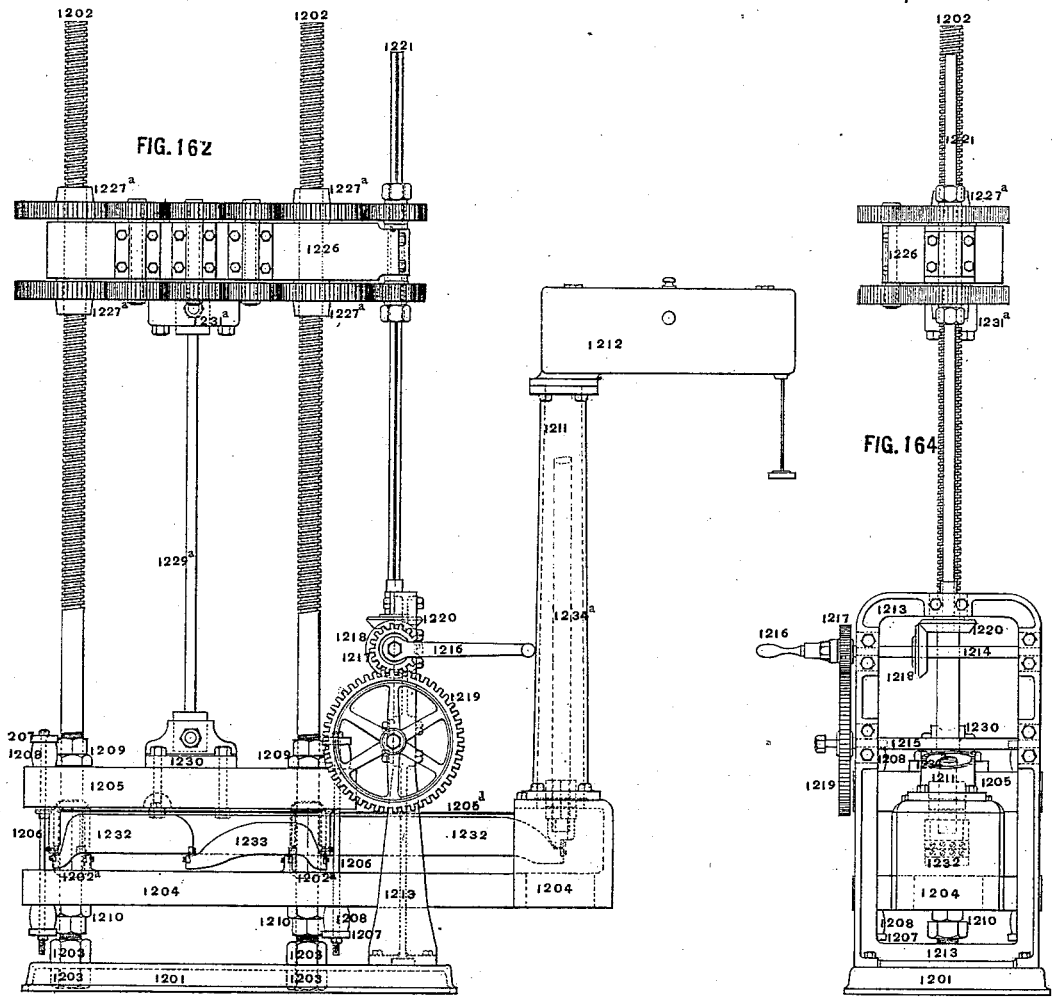
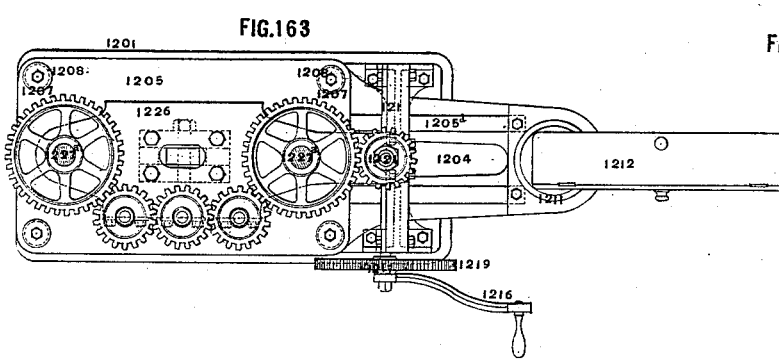
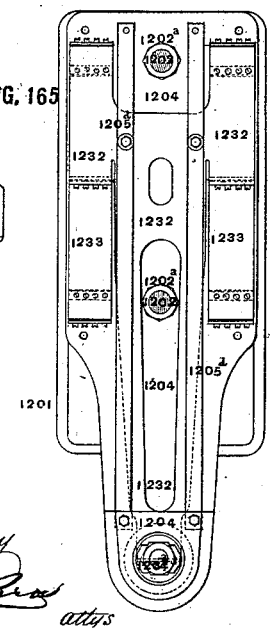

(No Model.) 8 Sheets—Sheet 3.
A. H. EMERY.
MACHINERY FOR TESTING THE STRENGTH OF MATERIALS.
No. 278,915. Patented June 5, 1883.
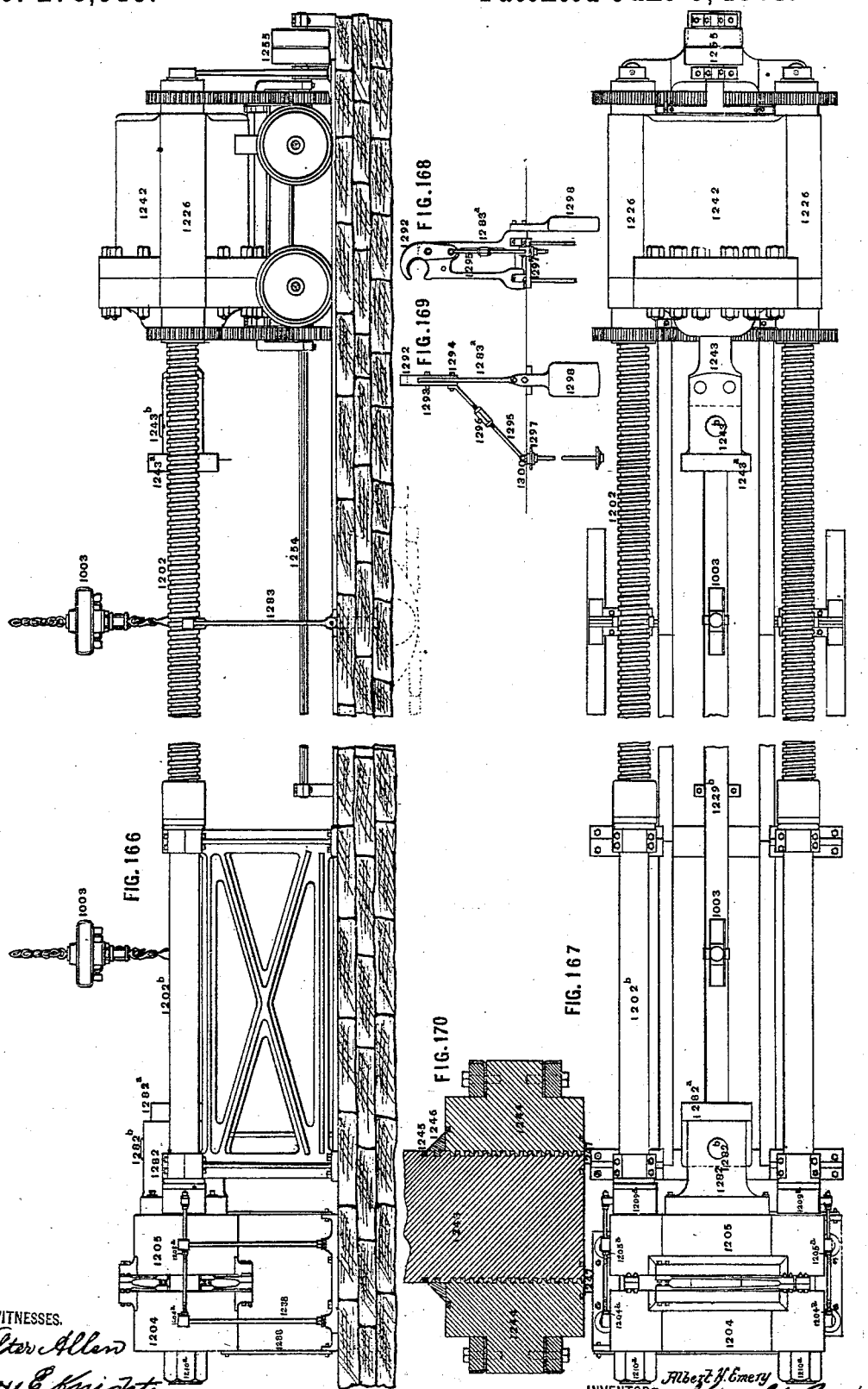

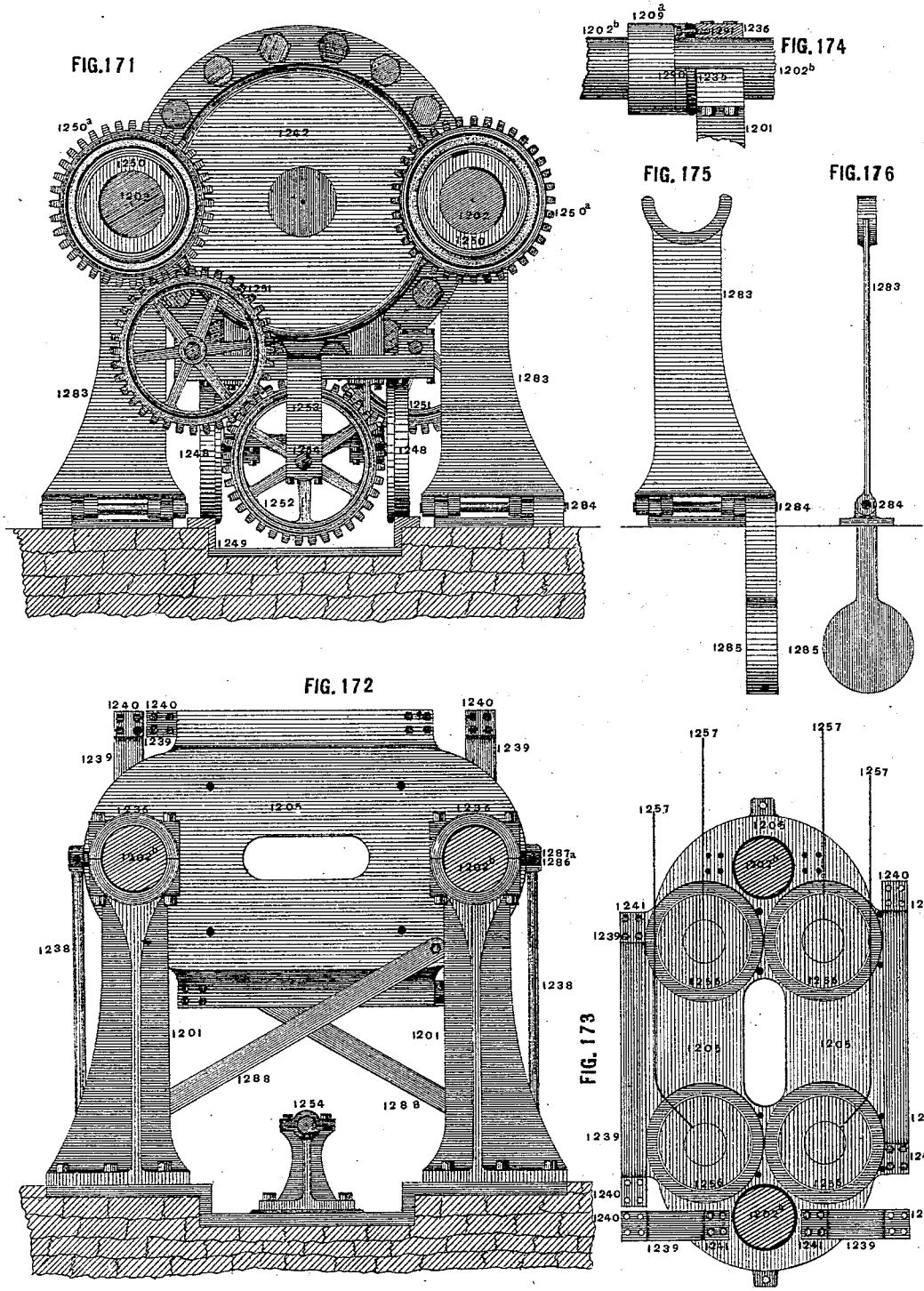

(No Model.) 8 Sheets—Sheet 5.
A. H. EMERY.
MACHINERY FOR TESTING THE STRENGTH OF MATERIALS.
No. 278,915. Patented June 5, 1883.
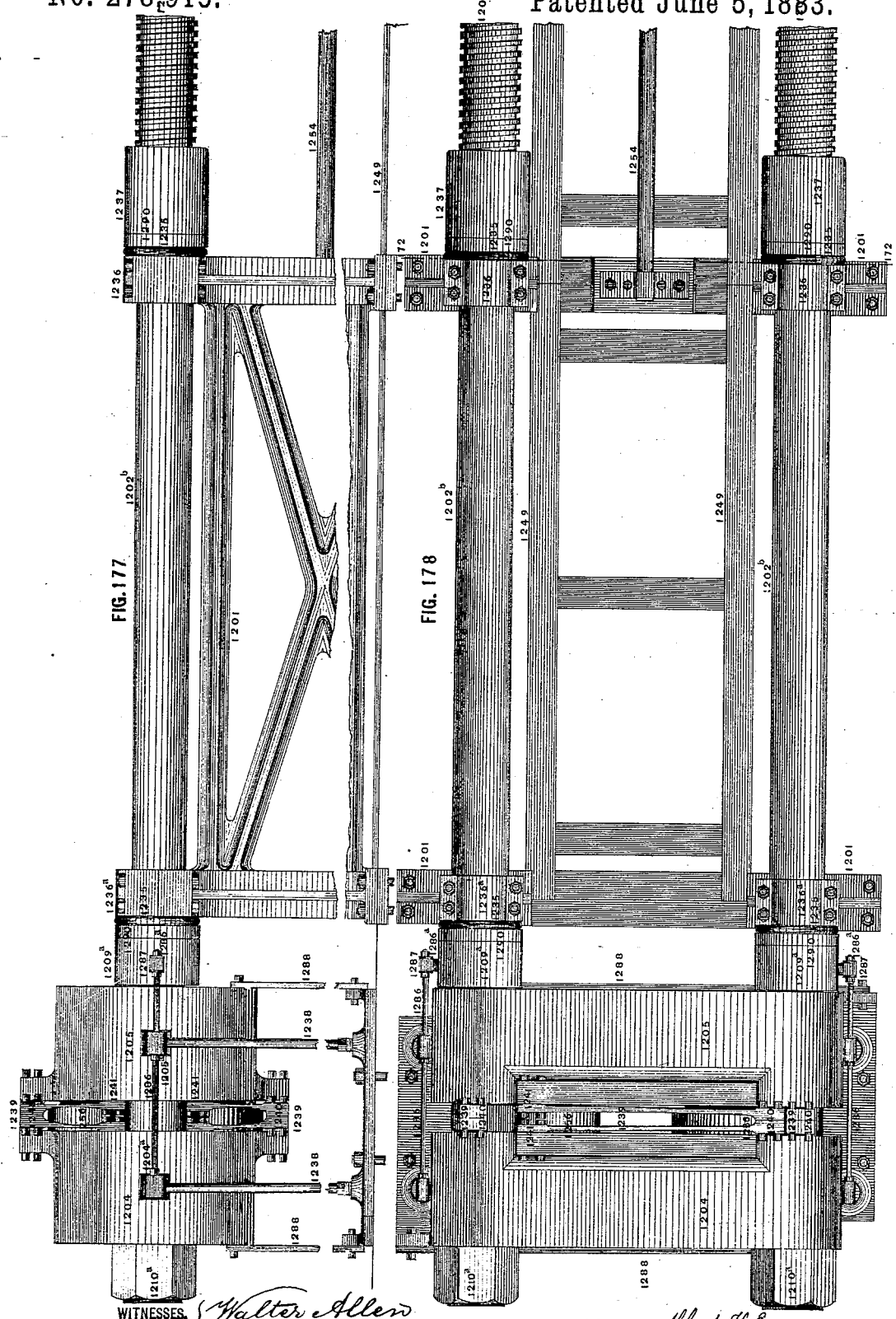

(No Model.)  8 Sheets—Sheet 6.
A. H. EMERY.
MACHINERY FOR TESTING THE STRENGTH OF MATERIALS.
No. 278,915.  Patented June 5, 1883.
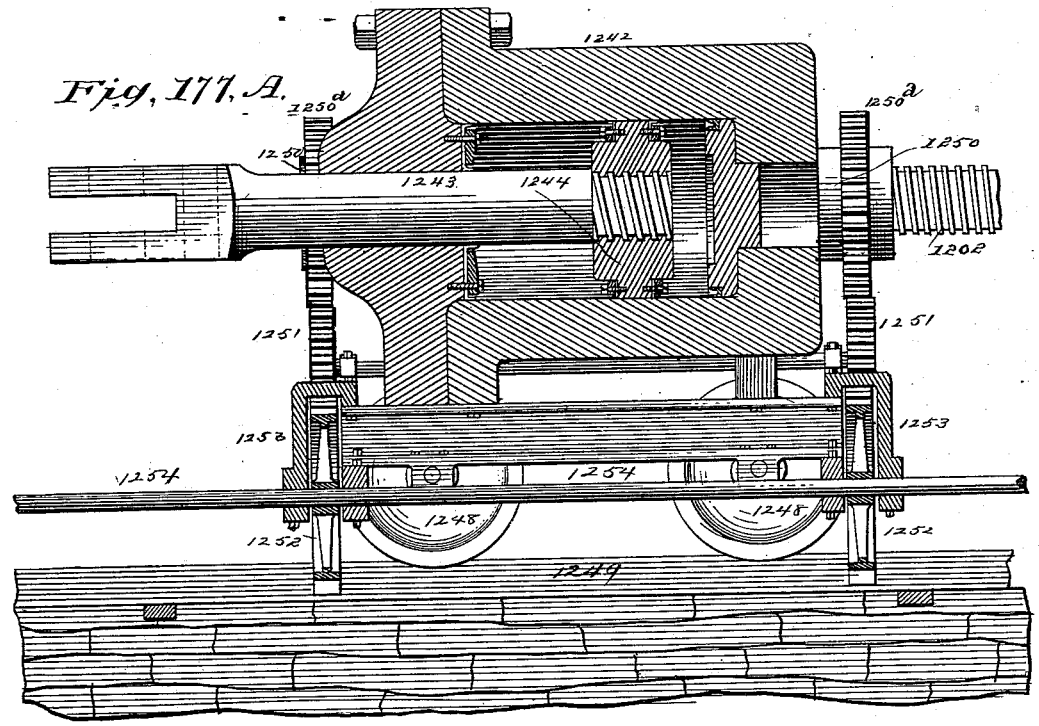
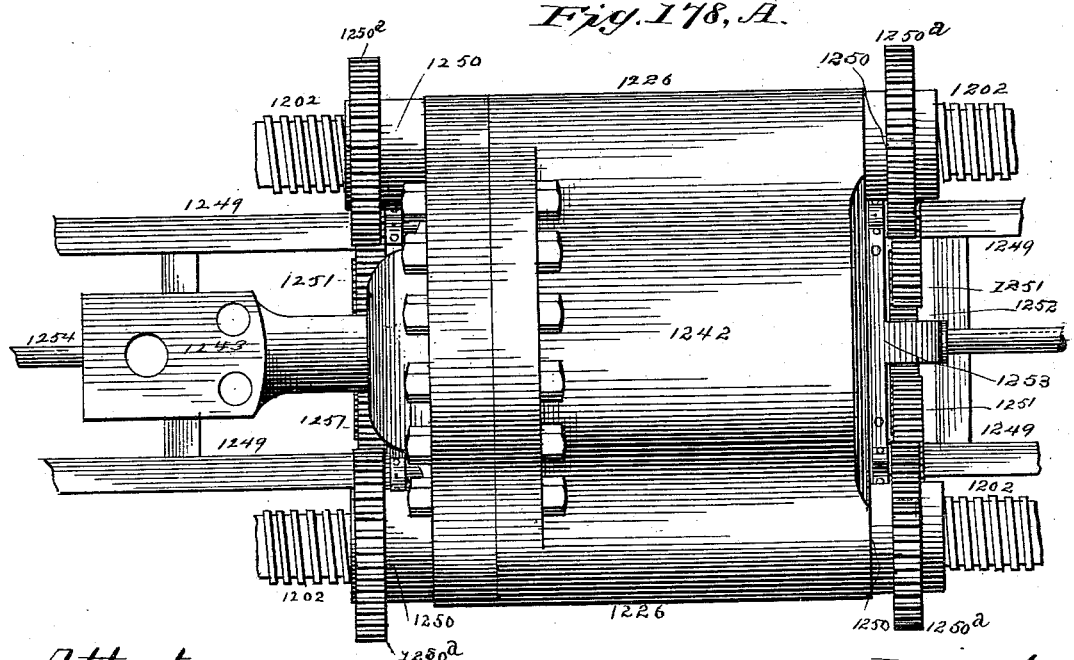

(No Model.) 8 Sheets—Sheet 7.

A. H. EMERY.
MACHINERY FOR TESTING THE STRENGTH OF MATERIALS.

No. 278,915. Patented June 5, 1883.

WITNESSES. Walter Allen
Harry E. Knight

INVENTOR.
Albert H. Emery
By Knight Bros.

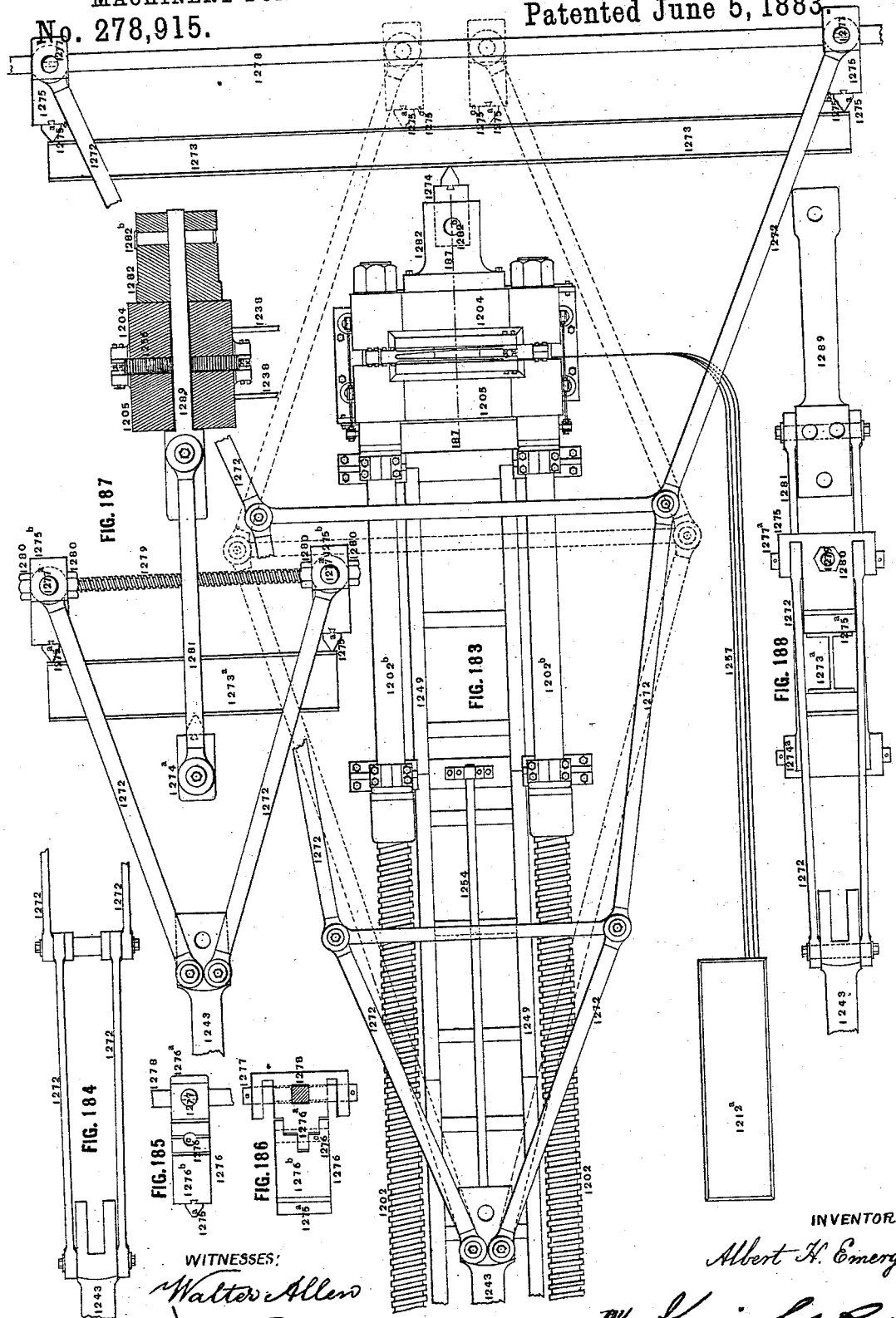

UNITED STATES PATENT OFFICE.

ALBERT H. EMERY, OF NEW YORK, N. Y., ASSIGNOR TO THE EMERY SCALE COMPANY, OF STAMFORD, CONNECTICUT.

MACHINERY FOR TESTING THE STRENGTH OF MATERIALS.

SPECIFICATION forming part of Letters Patent No. 278,915, dated June 5, 1883.

Application filed February 5, 1881. (No model.)

*To all whom it may concern:*

Be it known that I, ALBERT H. EMERY, of the city, county, and State of New York, have invented certain new and useful Improvements in Machinery for Testing the Strength of Materials, of which the following is a specification.

This machine in its complete form is constructed with a double-acting hydraulic press for producing the strain, whether of tension or compression, and so that the same hydraulic press may, by the movement of its ram in one or the other direction, apply a direct strain of either tension or compression to the specimen instead of necessitating, as is the case with some other machines, the interposition of intermediate parts, so as to apply a strain to the specimen in reversed direction by a movement of the ram in the same direction. The piston-rod is screwed in the head and the joint is closed by packing covered by annular metallic rings bent at their edges and secured to the surfaces of the rod and head, as hereinafter described. The press is moved and held by screw-gearing for purposes of adjustment. The said gearing is also applicable for producing strains of tension or compression. The scale end of the machine is constructed with a pair of beams with scale-levers or hydraulic supports interposed between them. The said beams are coupled together, and either one or the other at will connected with the screws to which the straining beam or press is attached while the other receives the load, so that the said coupled beams are adapted to sustain at the will of the operator a strain of either tension or compression which may be applied to the specimen by the straining beam or press and to transmit the said strain to the weighing apparatus through the medium of mechanism interposed between them. Nuts or setting-rods are provided on the attaching-screws, so that the beam which is to serve as the bed of the scale may be brought to a fixed bearing on the screws before the strain is applied, the other beam being disconnected from the screws and free to be acted on by the load from the specimen. In connection with the coupled beams and their attachments, springs of rubber or other material are employed to press the said beams firmly together against the interposed weighing mechanism. The screws connecting the straining beam or press and the coupled scale-beams are, in the horizontal form of the machine, sustained at proper intervals by struts or standards so arranged on the bed of the machine and counterbalanced as to permit the carriage of the straining beam or press to pass over them as it is moved for adjustment, and to cause the said supports to resume their upright position. In cases where the weight of the screw is not sufficient to keep it from upward deflection and keep it to its bearing on the top of the supporting-strut, said strut is constructed with a hinged cap to hold the screw while the machine is in operation and release it when the strut is to be turned down. The strut is braced to hold it against deflection under the action of the screw when the machine is under recoil. For applying transverse strains a jointed truss is employed, connected at one end to the straining-bar of the press or beam, and expanded at its other end to any necessary extent to bear near the ends of a specimen of any length. The free ends of the straining-truss are held at the required distance asunder by a chord-beam and clamp-screws, and are provided with jointed bearings adapted to follow the curvature of the specimen under strain without slipping thereon. For straining shorter specimens a second truss-chord is provided, constructed with a screw-thread, on which the bearings are adjusted, each by a pair of nuts. A beam-link passing through the coupled beams and connected with a pair of links passing around the threaded truss-chord and the specimen being tested, and connected with a suitable bearing to rest on the center of the said specimen, enables such short specimen to be tested at a point between the straining-beam and coupled scale-beams. Buffer-springs are provided in connection with the pillar-blocks, in which the main connecting-screws are supported to take up the recoil of said screws and other parts of the machine in the event of the breakage of a specimen. In large power-machines the strain is transmitted and weighed through the medium of hydraulic-pressure supports, and, if necessary, through one or more pressure-reducers. The support or reducer is provided with an annular lining soldered to the base and to the pressure-chamber diaphragm, which diaphragm may be corrugated to compensate for variations in temperature. The diaphragms of the pressure-chambers are bent at one or both edges and secured within a suitable groove or grooves by the application of solder. For sustaining heavy pressures it is preferred to construct the pressure-supports with an annular column having a reducing pressure-column located concentrically within it and moving in an opposite direction, as hereinafter described. The inner pressure-column is stayed against lateral motion by a boss recessed into it and rigidly connected to the diaphragm. To permit a slight lateral movement relatively between the base of the pressure-support and the beam against which it rests, due to the extension and compression of their surfaces under loads, rubber springs are interposed, said springs being set in recesses in the support-base, and projecting therefrom sufficiently to prevent contact between the base and the beam.

Figure 179:
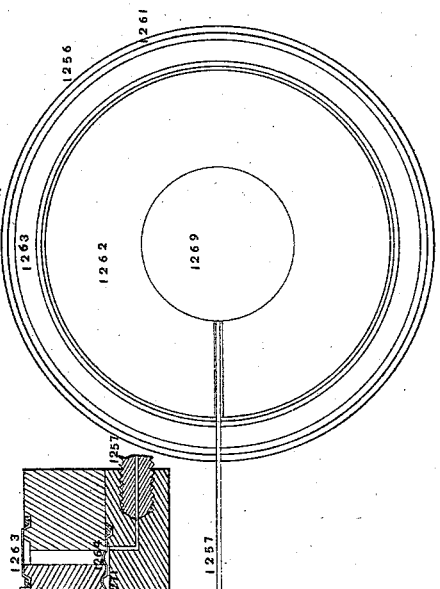
Figure 181:
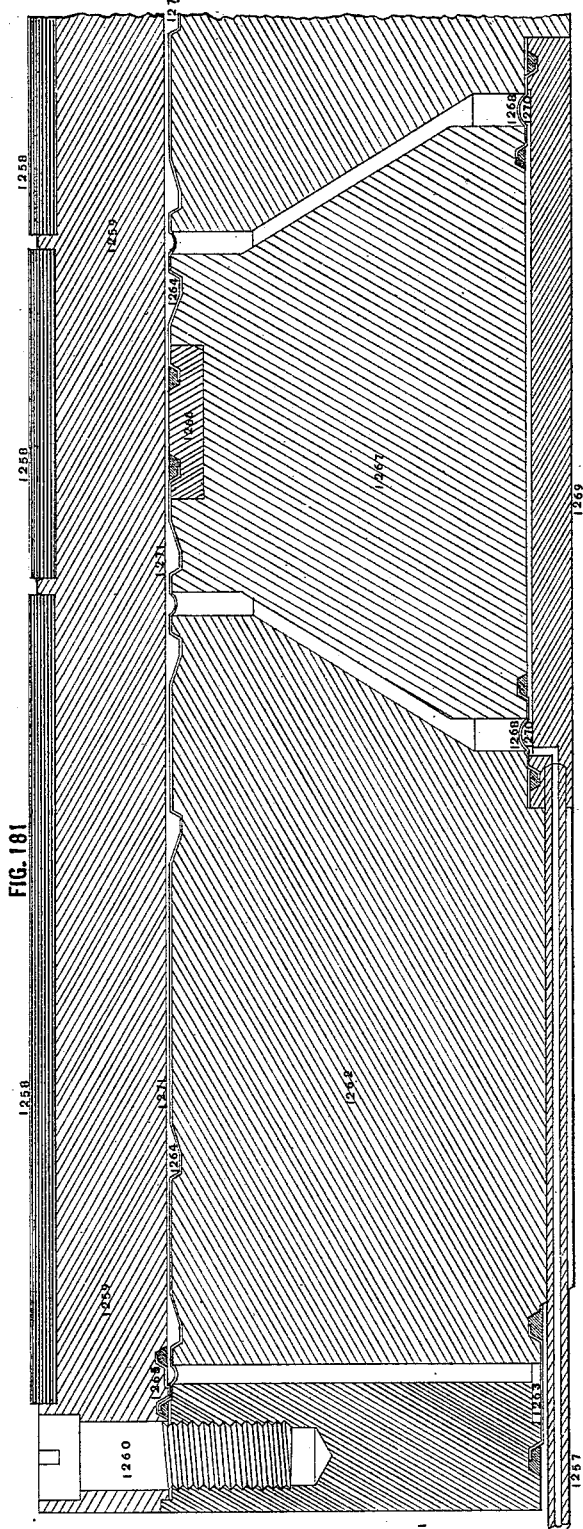
Figure 182:
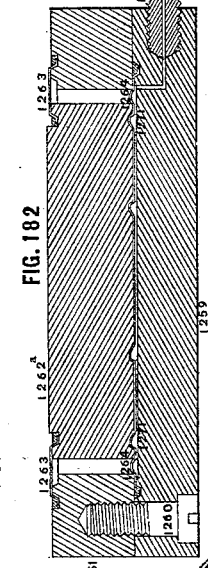

The invention is represented in the accompanying drawings by thirty-four figures, numbered 157 to 188, inclusive. Figure 157 is a front elevation of a hand testing-machine with coupled beams, showing a specimen link undergoing a strain of tension. Fig. 158 is a plan of the same. Fig. 159 is a side elevation of the same. Fig. 160 is a plan of the base, showing the position of the weighing-levers. Fig. 161 is a detached view of a beveled gear. Fig. 162 is a front elevation of a machine, showing a modification in the arrangement of the levers and driving-gear with a specimen undergoing a strain of compression. Fig. 163 is a plan of the same. Fig. 164 is a side elevation of the same. Fig. 165 is a plan of the base, showing the arrangement of the levers. Fig. 166 is a side elevation of a horizontal machine, illustrating the invention. Fig. 167 is a plan of the same. Figs. 168 and 169 are elevations of a screw-support and its accessories. Fig. 170 is a detached longitudinal section of the piston of the press. Fig. 171 is a rear elevation of the press end of the machine. Fig. 172 is a transverse section on the line 172, Fig. 178. Fig. 173 is an elevation of the inner face of one of the coupled beams and its attachments, showing the liquid-pressure supports. Fig. 174 is a sectional elevation of a buffer-spring in connection with the screw and pillar-block. Figs. 175 and 176 are elevations of a screw-support. Fig. 177 is a front elevation of the scale end of the machine. Fig. 178 is a plan of the same. Fig. 177$^a$ is a vertical longitudinal section of a straining-beam containing a hydraulic press. Fig. 178$^a$ is a plan of the same. Fig. 179 is a plan of the top of a hydraulic support for the scale of a testing-machine. Fig. 180 is an under side view of the same. Fig. 181 is a vertical section, on a larger scale, of a portion of the support on line 181, Fig. 180. Fig. 182 is a vertical section of a hydraulic support, showing a modification in construction. Fig. 183 is a plan of the scale end of the machine in its application to testing transverse strains. Fig. 184 is an elevation of a portion of the jointed straining-links. Fig. 185 is a plan of a jointed load-support. Fig. 186 is an elevation of the same. Fig. 187 is an elevation showing the application of a transverse load to a short specimen, and a section of the scale-beams and beam-block on the line 187, Fig. 183. Fig. 188 is a plan of the same with the beams and beam-block removed.

Figs. 157 to 165, inclusive, represent small upright machines, illustrating the invention.

Referring to Figs. 157 to 161, inclusive, 1201 represents a bed-plate on which are mounted two or more stationary screws, 1202, rigidly secured to the bed by nuts 1203. The said screws pass through the two beams 1204 1205, which are coupled together by rods 1206, nuts and washers 1207, and gum or other springs 1208, and are further connected by lock-nuts 1209 1210, applied to the screws 1202, said nuts constituting the fixed bearings of whichever of the coupled beams may for the time being constitute the bed of the scale, according to whether a strain of tension or of compression is applied to the specimen, as hereinafter described. The beam 1204 is extended horizontally, as shown in Fig. 157, to form the attachment for the hollow pillar 1211, on which is supported a weigh-case, 1212, of any suitable construction. On the bed-plate 1201 are mounted standards 1213, to afford bearing for the shafts 1214 and 1215, on one of which are fixed the crank 1216, pinion 1217, and beveled pinion 1218. The shaft 1215 is also adapted to receive the crank 1216, and has keyed upon it a cog-wheel, 1219, gearing with the pinion 1217 for the purpose of imparting a more rapid rotation to the shaft 1214 when required. The beveled pinion 1218 gears with the second beveled pinion, 1220, on a vertical shaft, 1221, carrying and rotating by a spline the sleeve 1221$^a$, to which are keyed beveled pinions 1222, which gear with screw-pinions 1223, keyed on horizontal worm-shafts 1224 1225. The sleeve 1221$^a$ and shafts 1224 1225 run in boxes attached to the straining-beam 1226, which is carried on the straining-screws 1202. The worm-shafts 1224 1225 impart rotation to worm-wheels 1227 1228, which are threaded to work on the screws 1202 and bear upon the beam 1226 above and below, so as to move the beam forcibly up or down.

1229 represents a specimen eye-bar or link undergoing a strain of tension. Said specimen is connected by its eyes and suitable bolts to beam-blocks 1230 and 1231, which are placed, respectively, beneath the beam 1204 and above the beam 1226.

1232 and 1233 represent, respectively, main and secondary levers, attached by flexible fulcrum-plates to the beams 1204 and 1205, between which they are interposed in such a manner as to transmit a definite portion of the load through the tension-rod 1234 (shown in dotted lines in Fig. 157) at the extremity of the lever 1232, extending up through the hollow pillar 1211 and connecting above with a suitable scale-beam in the weigh-case 1212. It will now appear that in this mode of using the machine the tension applied to the specimen 1229 will be received first by the beam 1204, which thus constitutes the platform of the scale, while the beam 1205 constitutes the stationary bed, and the pressure between them being the strain upon the specimen, added to the previously-balanced initial load produced by the springs 1208, is transmitted in a reduced ratio through the levers 1232 1233 and tension-rod 1234. If it be desired to apply to a specimen a strain of compression, the said specimen is interposed directly between the beam 1205 and the straining-beam 1226, the beam-blocks 1230 1231, or modified forms thereof, being placed on the opposite sides of the coupled beams and straining-beam, respectively. By means of the setting-nuts 1202$^a$ the coupled beams 1204 1205, with their connections, are moved away from the nuts 1209, bringing the beam 1204, which is now to serve as the scale-bed, firmly against the lock-nuts 1210, which constitute fixed and rigid bearings therefor, as shown in Figs. 162 to 165, inclusive, where a machine of modified construction is represented applying a strain of compression to a specimen, 1229$^a$. By the adjustments described either of these machines is adapted at will for applying strains of either tension or compression by the direct action of the ram moved in the required direction, instead of necessitating the use of intermediate transmitting parts, so that one and the same movement of the ram may apply opposite strains to the specimens. The coupled beams are stayed against relative lateral motion by the transmitting-plates which connect the levers and beams and by the flexible fixing-plates 1205$^d$. For more full explanation of the mode of constructing and applying the transmitting plates and levers above referred to and of the weighing apparatus, reference is made to other applications of even date herewith, wherein they are specifically described and claimed.

The arrangement of the levers 1232 1233, shown in Figs. 162 to 165, inclusive, adapts them to impart an upward thrust to the column 1234$^a$ instead of a downward tension, as in the former illustration. This form of the weighing apparatus I have also described in other applications of even date herewith. This machine may be substantially similar in other respects to that already described. In each illustration the crank 1216 is shown on the pinion-shaft 1214, so as to operate with the greatest power. For more rapid adjustment of the straining-beam 1226 when it is not used for applying the strains, the crank 1216 is adjusted to the shaft 1215, so as to drive the pinion-shaft and connections with multiplied speed through the medium of the cog-wheel 1219. In the machine shown in Figs. 162 to 165, inclusive, the nuts 1227$^a$ are driven directly by gears operated by the shaft 1221 instead of through the medium of screw-shafts 1224 1225, as in the other machine.

For machines of large capacity it is preferred to employ hydraulic-pressure supports for transmitting and weighing the strain and a double-acting hydraulic press for applying the strain either of tension or compression. A horizontal machine of this kind is shown in Figs. 166 and 167, and its details in the subsequent figures.

In Figs. 166, 167, 177$^a$, 178$^a$, 171, 172, 173, 174, 177, 178, and 183, 1202 1202$^b$ represent a pair of horizontal screws passing through the coupled beams 1204 1205 and adapted to afford a rigid support to either at will, as hereinafter described. The screws 1202 1202$^b$ are supported by pillar-blocks 1236 1236$^a$ on the frame 1201, and are held longitudinally by collars 1209$^a$ and 1237, forged on the shafts 1202$^b$ of the screws, and bearing against the pillar-blocks 1236 1236$^a$, with springs 1235 interposed to take up the recoil in the event of the breaking of a specimen. The shafts 1202$^b$ may be forged each in one piece with its screw 1202, or, if preferred, for convenience of construction, the collars 1237 being forged on the extremities of the connecting-shafts 1202$^b$, may be threaded internally, and the screws 1202 may be screwed therein.

The mode of constructing and applying the buffer-springs is shown in detail in Fig. 174, in which 1235 shows one of the springs and 1290 a collar fitted to slide on the screw-shaft and fixed to the pillar-block by screws 1291, compressing the spring 1235 to its normal position, so that it will exert no force to move the screw-shaft 1202$^b$ until it is further compressed by the collar 1209$^a$ under the recoil resulting from breaking a specimen. The resilience of the springs will then restore the screws to their normal position, the motion of the collars 1290 being arrested by the screws 1291. The beams are set in either direction, to bring either against its bearings, by means of setting-nuts 1204$^a$ 1205$^a$, bearing against lugs on the respective beams and working on setting-rods 1286, which pass loosely through the lugs on the beams 1205, so as to avoid friction, and are fixed by nuts 1286$^a$ to lugs 1287 on the collars 1209$^a$ of the main screws.

In Figs. 166, 167, 177, and 178 the rear beam, 1204, is shown resting against nuts 1210$^a$ on the screws, so as to serve as the stationary bed of the scale, while the beam 1205 constitutes the free platform.

In Figs. 166 and 167 the specimen 1229$^b$ is shown undergoing a strain of compression. When the machine is to be used for producing a strain of tension on the specimen the nuts 1204$^a$ are turned back, leaving the beam 1204 free, and the nuts 1205$^a$ are then turned up to force and hold the beam 1205 immovably against the bearing-collars 1209$^a$ on the screws 1202$^b$ 1202. In this machine the load is transmitted from the specimen under compression to the beams through the beam-block 1282 and compression-platform 1282ª, fastened thereto by the pin 1282ᵇ, and to the straining-bar 1243 by the compression-platform 1243ª, fastened thereto by the pin 1243ᵇ.

The beams 1204 1205 are supported by the flexible or jointed standards 1238, which permit their free horizontal play, as required for weighing the strain, and they are stayed against lateral motion by braces 1288. The said beams are connected by metal springs 1239, adapted to press them together, so as to prevent backlash and fix them against relative lateral motion.

In large machines it is preferred by means of the springs 1239 to apply an initial pressure of a few thousand pounds in order to bring the parts to their bearings. This initial pressure is balanced on the scale before applying the strain to the specimen. The above details are more fully shown in Figs. 172, 173, 177, and 178. The springs 1239 are connected together at 1240, as represented, and at their ends 1241 are bolted to the respective beams 1204 1205.

The straining-beam 1226 in machines of large capacity consists of a double-acting hydraulic press, 1242, as shown in Figs. 166, 167, 177ª, and 178ª.

1243 represents the piston-rod for attachment to the straining-rod or specimen-connection, and 1244 a piston screwed upon the said rod 1243, with a packing of any suitable kind on its periphery. The joint between the piston and its rod is protected, as shown in detail in Fig. 170.

1245 is a packing of soft metal or other suitable material applied around the joint of the front face, and 1246 an annular metallic plate bent at its edges and either soldered or keyed by the packing 1245 in grooves formed in the surfaces of the piston-rod and piston, as shown. On the rear face, 1247 represents a metallic plate, which may constitute either a ring or a disk. In the latter case it would extend completely over the end of the piston-rod. In the present illustration it is shown in annular form connected by its bent edges to grooves in the faces of the rod and piston by packing similar to that shown at 1245.

For setting the straining-beam in proper position to receive a specimen of any length it is moved back or forth on its wheels 1248, running on the track 1249, by the action of nuts 1250, on which are keyed cog-wheels 1250ª, gearing with cogged idlers 1251, which receive rotation from pinions 1252, carried by a bracket, 1253, and fitted to slide on a splined shaft, 1254, which is rotated by a pulley, 1255, or other means. The strain of either tension or compression is transmitted by pressure between the beams 1204 1205 through the medium of hydraulic-pressure supports 1256, interposed between the said beams, as shown in Figs. 177 and 178, and in Fig. 173, the latter being a face view of one of the beams with the supports applied.

1257 are liquid-pipes for transmtiting the pressure to suitable weighing apparatus, the details of which I have described in other applications of even date herewith. The preferred form of liquid-pressure supports interposed between the beams of machines of large capacity is illustrated in Figs. 179, 180, 181.

Fig. 179 is a view of one face of this support, and Fig. 180 of the other face. The circular outlines in Fig. 180 indicate rubber springs 1258, which are represented in section in Fig. 181. The said springs are recessed into the base, as shown, and, constituting one bearing-face of the support, permit the relative motion between the surfaces of the support and beam due to the extension and compression of such surfaces under a load.

1259 is the base of the support, secured by screws 1260 to the casing 1261, to which the main annular column 1262 is connected by a flexible fixing-plate, 1263. It will be observed that Fig. 181 shows a section of a little more than one-half of the structure taken through the axis. The main pressure-chamber is formed between the base 1259 and the pressure-column 1262 1267, the liquid being inclosed by a corrugated diaphragm, 1264, which is secured at its periphery to an annular lining, 1265, which, being soldered at its inner edge within an annular groove in the base 1259 and at its outer edge to the periphery of the diaphragm 1264, forms, in connection therewith, a perfectly-tight joint. The corrugation of the diaphragm 1264 enables it to adapt itself to changes in temperature without any injurious strain upon its connections. The center of the diaphragm 1264 is soldered to a boss, 1266, which is recessed in the smaller end of the secondary pressure-column 1267. If the diaphragm be continuous without perforation, the boss 1266 may be fixed to its center by sweat soldering; but it is preferred to make an aperture in the center of the diaphragm, as shown, for convenience in soldering. The larger end of this column 1267 is connected by an annular diaphragm, 1268, with a plate, 1269, connected with the annular column 1262 and constituting the base of the small pressure-chamber 1270 of column 1267. The liquid-pressure pipe 1257 communicates with the small pressure-chamber 1270. It will now appear that any pressure bearing on one side on the united parts 1269 1262, and on the other side on the springs 1258, applied to the base 1259, will produce compression in the chamber 1271. This pressure, acting on the smaller area of the frusto-conical column 1267, will be transmitted to the liquid in the chamber 1270, and thence through the pipe 1257 in a degree reduced as much as the area of the larger face of the column 1267 is larger than that of the smaller face.

For machines of intermediate capacity, where it is not necessary to employ a pressure-reducer within the support, a simple liquid-pressure support may be employed—such as is shown in section in Fig. 182—1259 being the base, connected by screws 1260 to the casing 1261, and 1262ª being the pressure-column, which, as before, is connected by a corrugated diaphragm, 1264, with the casing, and is stayed against lateral motion by an annular fixing-plate, 1263. In this case the pressure is transmitted from the chamber 1271 through the liquid-pressure pipe 1257. In Figs. 173 and 183 four of the liquid-pressure pipes 1257 are shown conducting to a weigh-case, 1212ª, the details of which I have described in other applications of even date herewith.

Fig. 183 and the subsequent figures illustrate the application of the machinery to applying transverse strains.

To the straining-bar 1243, which may constitute the piston-rod of the hydraulic press, or may be attached thereto, are connected links 1272 of a jointed truss, which is adapted to be extended to any necessary length and lateral reach, so as to take in specimens of the required length.

1273 represents a specimen beam or girder, which may be supported from above at any necessary number of points throughout its length by suspension devices, (not here shown,) and when strained presses at its center against a bearing, 1274, attached by the pin 1282ᵇ to the beam-block 1282, which is applied to the beam 1204. The load is applied near the extremities of the specimen or at other desired points through the medium of load-blocks 1275, in which are placed suitable bearings, 1275ª, to press against the specimen. The load-blocks 1275 are fixed adjustably to the chord-beam 1278 by screws 1277, which also connect to the said load-blocks the links 1272. To enable the specimen to bend without the slipping thereon of the load-bearings 1275ª, the load-blocks 1275 are constructed with knuckle-joints 1276, as illustrated in Figs. 185 and 186, and the two parts 1276ª and 1276ᵇ are connected by the pin 1276ᶜ.

A short specimen, 1273ª, may be tested in the space between the straining-bar 1243 and the beams 1204 1205 by the employment of the first set of links 1272 of the truss, as illustrated in Fig. 187, carrying bearings 1275ᵇ, which are held at the requisite distance asunder by a threaded truss-chord, 1279, and two pairs of setting-nuts, 1280, the central bearing-block, 1274ª, being connected by links 1281, beam-link 1289, and pin 1282ᵇ to the beam-block 1282 on the beam 1204. These devices enable one and the same machine to be used for straining specimens of different lengths in the different positions shown. For straining very small short specimens the load-blocks 1275 are constructed with secondary bearings 1275ᶜ at their inner sides, as shown in Fig. 183, the dotted lines in said figures showing the load-blocks 1275 adjusted in close proximity. The bearings 1275ᶜ admit of the application of a specimen of the shortest length, the main bearings 1275ª being removed, if necessary.

1283, Figs. 166 and 177ª, are struts, which are arranged at proper intervals to sustain the horizontal screws 1202 against deflection by their weight while they are under a strain of compression, which they sustain in applying a strain of tension to the specimen. The construction of these struts is shown in detail in Figs. 175 and 176. They are hinged, as shown at 1284, to suitable bearings, and are constructed with counterbalance-weights 1285, which cause them to assume an upright position after being deflected.

In cases where the weight of the screw is not sufficient to hold it to its bearings on the top of the struts, said struts are constructed, as shown on a reduced scale at 1283ª in Figs. 168 and 169, with a cap, 1292, hinged on a pin, 1293, in such position that it will permit the free turning of the cap on and off the screw.

1294 is a bolt, which fixes the swinging cap in either position to lock the strut to the screw or to leave it free to be tipped down.

1295 is a brace-rod, attached by the bolt 1294 to the strut 1283ª, and swinging on a pin, 1300, fixed in a bearing-plate, 1297, the latter being firmly bolted to the masonry bed of the machine.

1296 represents an adjusting-nut to regulate the length of the two-part brace 1295.

The counterbalance-weight 1298 may be cast in one piece with the strut or made separately and fastened thereto by screws 1298ª, as shown in Figs. 168 and 169. The struts are adapted to yield in either direction as the straining-press carriage passes over them in moving it in either direction, and to resume their normal vertical position as soon as released.

Hydraulic holders for holding specimens for strains of tension and torsion and other details of the machinery are described in other applications of mine of even date herewith.

Whatever novel subject-matter I have set forth and not claimed or attempted to claim herein I have claimed or attempted to claim in other applications, or have reserved to be claimed in future original applications.

The following is here claimed as new:

1. The combination, with the straining-beam of a testing-machine, of a double-acting hydraulic press, applying to the specimen a strain of either tension or compression, at the will of the operator, substantially as set forth.

2. In a testing-machine, a double-acting hydraulic press constructed and adapted to give strains of compression or tension upon the specimen at will without the necessity of changing the position of the specimen.

3. In a testing-machine, a double-acting hydraulic press constructed to give strains of compression or tension upon the specimen at will without the necessity of introducing intermediate parts in changing the action from compression to tension, or vice versa.

4. The combination, with the piston and piston-rod of a hydraulic press, of one or more packing rings or plates, 1246 1247, and packing 1245, substantially as set forth.

5. In a testing-machine, the combination, with a double-acting hydraulic press, of screws and nuts for setting and holding said press, or for producing strains of tension or compression.

6. The combination, in a testing-machine, of two beams with levers or hydraulic supports between them to receive the strain from the specimen being tested, the two beams both being movable and separate from the main or fixed bed of the machine.

7. A testing-machine constructed with two coupled beams or platforms, arranged for optional use, so that they constitute, respectively, the fixed bed and the free or operating beam or platform for measuring strains in opposite directions.

8. One or more pairs of nuts operating on suitable screws, in connection with a pair of coupled beams, to set either of said beams at will against its stationary bearings, substantially as set forth.

9. The small nuts $1204^a$ $1205^a$ and setting-rods 1286, in combination with the beams 1204 1205, for forcing and holding against its bearings either of said beams which is to be used as the bed of the scale.

10. The combination of a pair of coupled scale beams or platforms, a movable straining-beam or press, and two or more connecting screws or links arranged to receive at will a strain of tension or compression.

11. In combination with the two movable beams constituting the bed and platform of the scale, springs of rubber, metal, or other material for pressing and holding the said beams together, as set forth.

12. The supports or struts 1283, to sustain the screws against deflection, substantially as set forth.

13. The hinged cap 1292, operating in combination with the hinged support $1283^a$ and screws 1202, substantially as and for the purposes set forth.

14. The hinged and adjustable brace 1295, in combination with the hinged support $1283^a$, as and for the purpose described.

15. The straining-truss consisting of hinged or jointed links 1272, and a chord-beam 1278, for holding the bearings at any required distance asunder.

16. The combination, in a testing-machine, of a straining beam or press, and the straining-truss for connecting with the specimen to be tested, substantially as described.

17. The combination of a straining-truss and its bearings with one or more load-bearings and a scale beam or platform, substantially as set forth.

18. The jointed bearing 1276, constructed to operate substantially as herein set forth.

19. The combination of the straining-rod 1243, the truss 1272 1279, and its bearings $1275^b$, the connecting-links 1281 1289, with a load bearing or bearings, and a suitable scale beam or platform, substantially as set forth.

20. The combination of the truss-chord 1278, links 1272, adjustable bearings 1275, and clamp-screws 1277, as and for the purposes set forth.

21. The combination of the threaded truss-chord 1279, links 1272, movable bearings $1275^b$, and setting-nuts 1280 1280, as and for the purposes set forth.

22. In a testing-machine, the buffer-springs 1235, employed in combination with the screws 1202 $1202^b$, and pillar-blocks 1236, substantially as and for the purposes set forth.

23. The annular lining 1265, soldered to the base 1259 of a hydraulic support or reducer-chamber in the manner set forth.

24. The corrugated diaphragm 1264, in combination with a support, base, or column recessed to receive it, substantially as set forth.

25. A hydraulic-pressure support constructed with a base, 1259, annular lining 1265, and diaphragm 1264, substantially as set forth.

26. A diaphragm for a sealed pressure-chamber or a fixing-plate for a pressure-column, constructed with a bent edge or edges, in combination with a column, casing, base, or other part grooved for the reception of said bent edge or edges, as set forth.

27. A diaphragm or fixing-plate for a sealed pressure-chamber or a pressure-column bent at its edge or edges and secured within a suitable groove or grooves by the application of solder, substantially as set forth.

28. The boss 1266, combined with the diaphragm 1264 and pressure-column 1267, for preventing lateral motion of the latter, as set forth.

29. An annular pressure-column, 1262, with a reducing pressure-column, 1267, located concentrically within it and moving in the opposite direction, substantially as set forth.

30. A continuous diaphragm, 1264, permanently secured to the base 1259 or its lining 1265 and separable from the pressure-column.

31. The casing-ring 1261, annular diaphragm 1263, and pressure-column 1262, 1267, or $1262^a$, in combination with the continuous diaphragm 1264, and separable therefrom.

32. The pressure-column 1262, 1267, or $1262^a$, casing-ring 1261, and the diaphragm 1263, permanently secured to each, in combination with the diaphragm 1264, and separable therefrom.

ALBERT H. EMERY.

Witnesses:
OCTAVIUS KNIGHT,
WALTER ALLEN.